Figure 1:
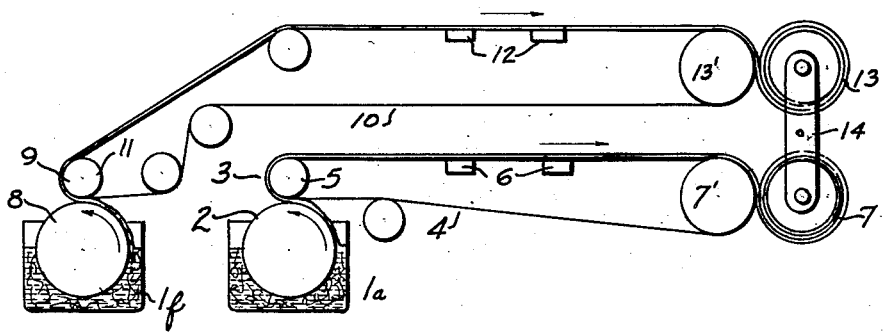

March 16, 1926.

R. P. PERRY ET AL

CONSTRUCTION MATERIAL

Filed March 18, 1921

1,577,074

INVENTORS
Ray P. Perry
Floyd W. Adams
BY
Chas. W. Mortimer
ATTORNEY

Patented Mar. 16, 1926.

1,577,074

UNITED STATES PATENT OFFICE.

RAY P. PERRY, OF UPPER MONTCLAIR, AND FLOYD W. ADAMS, OF EAST ORANGE, NEW JERSEY, ASSIGNORS TO THE BARRETT COMPANY, A CORPORATION OF NEW JERSEY.

CONSTRUCTION MATERIAL.

Application filed March 18, 1921. Serial No. 453,501.

*To all whom it may concern:*

Be it known that we, RAY P. PERRY and FLOYD W. ADAMS, citizens of the United States, residing at (1) Upper Montclair and (2) East Orange, in the county of (1) and (2) Essex and State of (1) and (2) New Jersey, have invented certain new and useful Improvements in Construction Materials, of which the following is a specification.

This invention relates to a process of producing a construction material for use in buildings and especially for use as a roofing material; and it also relates to the product itself.

One of the objects of the invention is to produce a construction material which shall be water-resistant. Another object is to produce a construction material which shall have good lasting qualities and shall not be deleteriously affected to a material extent by exposure to the weather. Another object is to produce a construction material which shall be fire-resistant and which shall be capable of being cut, sawed, nailed, or of having holes bored therethrough. Another object is to produce a construction material, a portion of which shall consist of a sheet or layer containing waterproofing material, such as pitch, asphalt, or other bitumens or the like, and fibrous material, such as paper-stock, rag-stock, etc. Another object is to provide a process whereby construction materials of different thicknesses and different specific gravities may be produced. Another object is to provide a process whereby such materials may be produced having different degrees of stiffness or rigidity from a flexible product up to a hard, stiff board. Other objects and advantages of the invention will be obvious as the description proceeds.

Heretofore construction material to be used for roofing purposes has been made by incorporating comminuted particles of hard solid waterproofing material in a sheet of felt during the formation of the sheet, after which the sheet was saturated or rendered water-resistant by melting the comminuted waterproofing material and permitting the same to spread throughout the sheet. It has been found that, due to exposure to the elements, such material deteriorates, apparently because of expansion and contraction due to water or moisture penetrating the fibers and causing the disintegration of the sheet. That is, the fibers swell when they absorb the moisture and contract when the moisture dries out, thus causing deterioration. Even when such sheets are covered with a layer or coating of waterproofing material, such as asphalt for example, the edges are sometimes affected to an objectionable extent and the sheet must be replaced after some time. Asbestos does not absorb moisture so readily and is therefore practically free from this objection, but roofing material made of asbestos is unsatisfactory for many purposes because it possesses so little mechanical strength and is also quite expensive.

In practicing the present invention a sheet similar to that which has heretofore been used is formed, and there is applied to this sheet on one or both sides thereof a layer or sheet containing asbestos and waterproofing material. The sheet of fibrous material and waterproofing material may be built up of several plies or layers of fibrous material and waterproofing material. The fibers in these plies or layers should be felted so that the plies or layers will possess considerable mechanical strength. The sheet or layer of asbestos and waterproofing material should also preferably be so formed that the asbestos is felted. The comminuted waterproofing material used in the sheets should be of such a nature that it will fuse upon being heated, and will serve as a binding or cementing agency and become set or hardened when cold, so that by using waterproofing material in the proper amount and of the proper melting point, the finished article can be made so as to possess the desired degree of stiffness or rigidity. The layer containing asbestos prevents in an effective way an objectionable amount of moisture from penetrating into the fibrous portion of the finished article. However, if desirable, a coating of waterproofing material, such as asphalt for example, may be applied to the asbestos layer, and wear-resisting material, such as crushed slate, stone, etc., may be applied to the asphalt. In case it is desired to protect the edges of the finished article more perfectly, the layer or layers containing the asbestos may be made a little wider than the portion containing the fibrous material, so that the edge of the asbestos layer may be bent around to protect the edge of the other layer.

The invention will be understood by reference to the accompanying drawings, in which arrangements of apparatus are indicated somewhat diagrammatically for carrying out the process. It will be understood that changes and modifications may be made without departing from the spirit or scope of the invention. In the drawings—

Fig. 1 indicates a somewhat diagrammatic side view of an arrangement of apparatus for practicing the invention.

Figure 2:
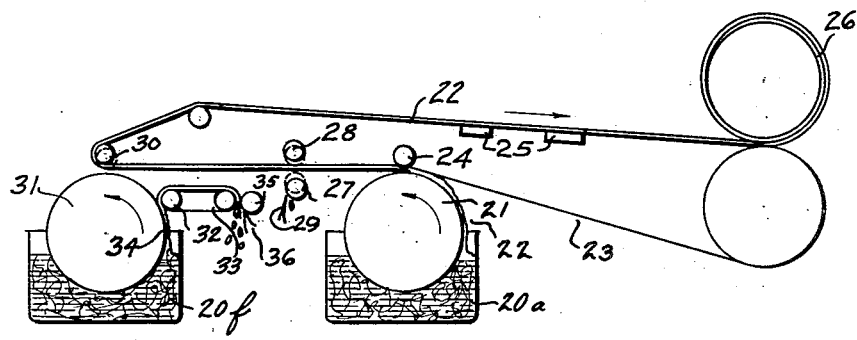

Fig. 2 shows a similar view of a different arrangement of apparatus.

In the drawings reference characters $1_a$ and $1_f$ indicate two tanks or vats containing respective mixtures of waterproofing material and asbestos, and waterproofing material and fibrous material, such as wood fibers, rag fibers, or other paper or felt-making stock. A foraminous cylinder 2 dips into the tank $1_a$ and revolves in the direction of the arrow, whereupon a sheet or layer 3 containing asbestos and comminuted waterproofing material is formed and picked up by means of the wet-blanket 4 passing over the couche roll 5. The sheet 3 passes over suction boxes 6, where a portion of the water is removed, and is afterwards picked up from the blanket 4 by means of the roller or mandrel 7, as described below.

A foraminous cylinder 8 dips into the tank $1_f$ and as it turns in the direction of the arrow it has formed thereon a sheet 9 containing fibrous and comminuted waterproofing material. The sheet 9 is picked up by means of the wet blanket 10 passing over the couche roll 11 and as it passes the suction boxes 12 a portion of the water is removed, after which the sheet 9 is picked up by means of the roller or mandrel 13. The rollers 7 and 13 are mounted on a framework 14 so that the same may be yieldingly pressed against the rollers 7' and 13' and may be reversed in position at the proper moment by mechanism not shown.

The operation is as follows:

A mixture of asbestos and comminuted waterproofing material is introduced into the vat $1_a$, whereupon the sheet 3 is formed and is picked up by means of the mandrel 7 from the blanket 4, this action continuing until a sufficient number of convolutions have been wound on the mandrel 7 to provide the desired thickness of the asbestos sheet or layer. The framework 14 is then turned so that the mandrels 7 and 13 exchange places, thereby severing the sheet 3 from the mandrel 7 and starting the sheet 3 to wind on the mandrel 13. When this reversal takes place with the mandrel 7 in contact with the wet blanket 10, the sheet 9, which is formed on cylinder 8 from fibrous and waterproofing material, begins to wind up on top of the asbestos layer that is already on mandrel 7. This operation is continued until the desired thickness or number of convolutions of the fibrous layer is wound upon the mandrel 7. The mandrels 7 and 13 are then again caused to exchange places, thus severing the sheets 3 and 9 and permitting a second asbestos layer or sheet to form on the outside of the fibrous layer that was wound on roller 7 while it was in the alternate position, and at the same time a fibrous layer is begun to be wound on the asbestos layer on mandrel 13. It will be obvious that this operation may be continued indefinitely, thus winding convolutions on both mandrels 7 and 13, which convolutions consist of inside turns of asbestos, central or medial turns of fibrous material, and outside turns of asbestos. This cylinder of convolutions is preferably made while the sheets 3 and 9 contain a considerable percentage of water, since the surfaces of the contacting convolutions will thereby be caused to mat or felt to a considerable degree when they are wound upon each other as above described.

The cylinder may be slit longitudinally and spread out flat and may then be partially or completely dried and pressed under a sufficiently high pressure and at a sufficiently elevated temperature so that the plies or layers become intimately joined or united with the bituminous material spread throughout the same.

The process may be carried out by the modified arrangement of apparatus shown in Fig. 2, in which reference characters $20_a$ and $20_f$ indicate vats or tanks containing watery pulps of asbestos and comminuted waterproofing material, and fibrous and comminuted waterproofing material, respectively. The foraminous cylinder 21 dips into the tank $20_a$ and has formed thereon a sheet 22 containing asbestos and comminuted waterproofing material which is picked up by the wet blanket 23 passing under the couche roll 24, after which it passes over the suction boxes 25 where a portion of the water is removed, and it is then picked up from the wet blanket 23 and wound upon the mandrel 26. When a sufficient amount of the sheet containing asbestos and waterproofing material has been formed to produce the desired number of convolutions on the mandrel 26, the rollers 27 and 28 are moved into the dotted line position, by mechanism not shown, into contact with the sheet 22 and wet blanket 23, whereupon the sheet 22 is picked up by the roller 27 from which it is removed by the doctor 29, and the pieces may be carried to a beater for rendering it in condition for subsequent use in the tank 20ₐ.

During the time the asbestos sheet 22 was being formed and rolled up on the mandrel 26, the couche roll 30 was moved out of contact with the cylinder 31 by mechanism not shown; also, at this time the roller 32 carrying the wet blanket 33 was in contact with the cylinder 31, thus picking up the layer 34 of fibrous and comminuted waterproofing material. This layer 34 is picked up during this time by the roller 35, from which it is removed by the doctor 36 and the pieces carried to a beater for rendering the same suitable as material for the tank 20ₜ.

As above stated, when a sufficient amount of the asbestos sheet 22 has been formed to provide the desired number of convolutions for the mandrel 26, the asbestos sheet is removed from the wet blanket 23 by the roller 27. Then the roller 32 is caused to cease removing the sheet 34 from the cylinder 31, and the wet blanket 23 passing under the couche roll 30 is caused to pick up the sheet 34 and carry the same to the mandrel 26 where a sufficient number of convolutions are wound up to constitute the desired thickness of the fibrous sheet, after which the roller 32 is again made to pick up the fibrous sheet 34 and the asbestos sheet 22 is again caused to be carried by the wet blanket 23 to the mandrel 26, as above described. In this way a cylinder is formed on the mandrel 26 having a fibrous layer or convolutions between the asbestos layers or convolutions.

In both arrangements of apparatus the cylinders upon which the asbestos sheets are formed may be longer than the cylinders upon which the fibrous sheets are formed, thus making the asbestos sheets wider than the others so that their edges may be folded over the edges of the fibrous sheets to protect the same. The subsequent hot pressing operation firmly unites and presses down the folded over edges of the asbestos sheets.

Various sorts of waterprofing and fibrous materials may be used, and it is not absolutely necessary to make a succession of laminations as solid sheets may be made of the required thickness, but it is preferable to make a plurality of plies and press the same, as above described. It is not necessary to wind the plies or layers on a cylinder, as the same may be applied to each other in a flat position, but the above way of practicing the invention has been found to be rapid and convenient. Very satisfactory results have been obtained by using pitch of a melting point of about 250°–300° F. as the waterproofing material, and using about 7 parts of pitch, more or less, by weight to 3 parts of asbestos or fibrous material. The asbestos layers on the outside of the finished article may be about .018 of an inch thick, more or less, and the interior of the finished article may consist of fibrous material about 0.17 of an inch thick, though these proportions may be varied widely. When a pressure of about 150–300 pounds per square inch is used with a temperature sufficiently high to fuse the waterproofing material, a finished article may be produced, the specific gravity of which is considerably greater than unity, say about 1.40. Even if the asbestos layers are not made wider than the fibrous layers so that the edges may be folded over, the edges may be saturated with a liquid waterproofing material or may be painted with a waterproofing paint to protect the same.

We claim:

1. As an article of manufacture, a sheet comprising a layer containing fibrous material and comminuted waterproofing material, and a layer containing asbestos and comminuted waterproofing material.

2. As an article of manufacture, a sheet comprising a layer containing fibrous material and comminuted waterproofing material covered on each side with a layer containing asbestos and comminuted waterproofing material.

3. As an article of manufacture, a sheet comprising a layer containing fibrous material and comminuted waterproofing material, and a layer containing asbestos and comminuted waterproofing material, the edges of said sheet being waterproofed.

4. As an article of manufacture, a sheet comprising a layer containing fibrous material and comminuted waterproofing material, and a layer containing asbestos and comminuted waterproofing material, an edge of the asbestos layer extending beyond and around the edge of the fibrous layer.

5. As an article of manufacture, a sheet comprising a layer containing fibrous material and waterproofing material, and a layer containing asbestos and waterproofing material, said article having been densified by heat and pressure so that its specific gravity is greater than unity.

6. As an article of manufacture, a sheet comprising a layer containing fibrous material and waterproofing material covered on each side with a layer containing asbestos and waterproofing material, the asbestos-containing portion being about one-fifth of the total weight of the sheet.

7. As an article of manufacture, a sheet comprising a layer containing fibrous material and waterproofing material covered on each side with a layer containing asbestos and waterproofing material, the asbestos-containing portion being approximately one-sixth of the total thickness of the sheet.

8. The process which comprises forming on a mandrel a layer containing felted fibrous material and waterproofing material, and applying thereto a layer containing asbestos and waterproofing material.

9. The process which comprises forming on a mandrel a layer containing asbestos and waterproofing material, a layer containing fibrous and waterproofing materials, and another layer containing asbestos and waterproofing material.

10. The process which comprises forming on a mandrel a layer containing asbestos and waterproofing material, a layer containing fibrous and waterproofing materials, and another layer containing asbestos and waterproofing material, slitting the cylinder thus formed, spreading it out, and hot pressing the layers to unite the same.

11. The process which comprises forming a layer containing fibrous material and waterproofing material, applying thereto a layer containing asbestos and waterproofing material, said latter layer being wider than the former and having its edge extending around the edge of the former.

In testimony whereof we affix our signatures.

RAY P. PERRY.
FLOYD W. ADAMS.